(12) United States Patent
Suzuki

(10) Patent No.: US 6,240,405 B1
(45) Date of Patent: May 29, 2001

(54) INFORMATION PROCESSORS HAVING AN AGENT FUNCTION AND STORAGE MEDIUMS WHICH CONTAIN PROCESSING PROGRAMS FOR USE IN THE INFORMATION PROCESSOR

(75) Inventor: Hideo Suzuki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/059,756

(22) Filed: Apr. 14, 1998

(30) Foreign Application Priority Data

Apr. 17, 1997 (JP) .................................................. 9-100434
Apr. 18, 1997 (JP) .................................................. 9-101876

(51) Int. Cl.[7] ........................... G06F 17/00; G06F 13/00; G10L 15/00
(52) U.S. Cl. ............................. 706/45; 704/246; 345/339
(58) Field of Search ............................... 706/45; 704/246; 345/339

(56) References Cited

U.S. PATENT DOCUMENTS

| | | | |
|---|---|---|---|
| 5,652,789 | * 7/1997 | Miner et al. ........................... | 379/201 |
| 5,687,367 | * 11/1997 | Dockter et al. ....................... | 707/102 |
| 5,781,723 | * 7/1998 | Yee et al. .............................. | 713/200 |
| 5,790,974 | * 8/1998 | Tognazzini ........................... | 455/456 |
| 5,831,664 | * 11/1998 | Wharton et al. ....................... | 348/13 |
| 5,857,201 | * 1/1999 | Wright, Jr. et al. .................. | 707/104 |
| 5,877,759 | * 3/1999 | Bauer .................................... | 709/317 |
| 5,928,325 | * 6/1999 | Shaughnessy et al. .............. | 709/206 |
| 6,012,083 | * 1/2000 | Savitzky et al. ..................... | 709/202 |

OTHER PUBLICATIONS

"Using a human face in an interface"; Janet H. Walker, Lee Sproull and R. Subramani; Conference proceedings on Human factors in computing systems:, 1994, p. 85.*

"Artificial life meets entertainment: lifelike autonomous agents"; Pattie Maes; Commun. ACM 38, pp. 108–114, Nov. 1995.*

"Comic Chat"; David Kurlander, Tim Skelly and David Salesin; Proceedings of the 23rd annual conference on Computer graphics, 1996, pp. 225–236.*

Toshihiro Ide et al: "An Intelligent Network Service Prototype Using Knowledge Processing" Proceedings of the International Conference on Tools for Artificial Intelligence, San Jose, Nov. 5–8, 1991, No. Conf. 3, Nov. 10, 1991, Institute of Electrical and Electronics Engineers, pp. 445–448.

Bocionek S: "Software Secretaries: Learning and Negotiating Personal Assistants for the Daily Office Work" Proceedings of the International Conference on Systems, Man, and Cybernetics, San Antonio, Oct. 2–5, 2994, vol. vol. 1, Oct. 2, 1994, Institute of Electrical and Electronics Engineers, pp. 7–12.

Anonymous: "Visual Dialog Showing Speech Interaction with an Intelligent Agent" IBM Technical Disclosure Bulletin, vol. 39, No. 1, Jan., 1996, New York, US.

* cited by examiner

Primary Examiner—George B. Davis
(74) Attorney, Agent, or Firm—Frishauf, Holtz, Goodman, Langer & Chick, P.C.

(57) ABSTRACT

The subject of the present invention is to cause an agent to smoothly respond to an user's request to utilize an agent function of accessing software more effectively than in the prior art. An agent computer block 16 selects an appropriate one of a plurality of agents corresponding to an accessing user on the basis of an agent table where the plurality of agents are recorded from voice data provided by an input/output interface computer block 15, reads out from a storage device 17 agent set information on the selected agent, transfers this set information to the input/output interface computer block 15, displays the selected agent's peculiar figure (mainly, face) on a display device 13 in accordance with the agent set information, and outputs from a voice output device 11 a message in the agent's peculiar voice.

23 Claims, 16 Drawing Sheets

FIG.3

AGENT TABLE

| OWNER'S VOICE INFORMATION | AGENT |
|---|---|
| | |
| | |
| | |

FIG.4

AGENT SET INFORMATION

| AGENT'S PECULIAR INFORMATION {(FRONT, SIDE) FACES, VOICE, NAME} |
|---|
| OWNER INFORMATION<br>( SCHEDULE FILE NAME, MAIL FILE NAME,<br>OWNER PRIVATE FILE NAME,<br>OWNER PREFERENCE INFORMATION,<br>OWNER PASSWORD ) |

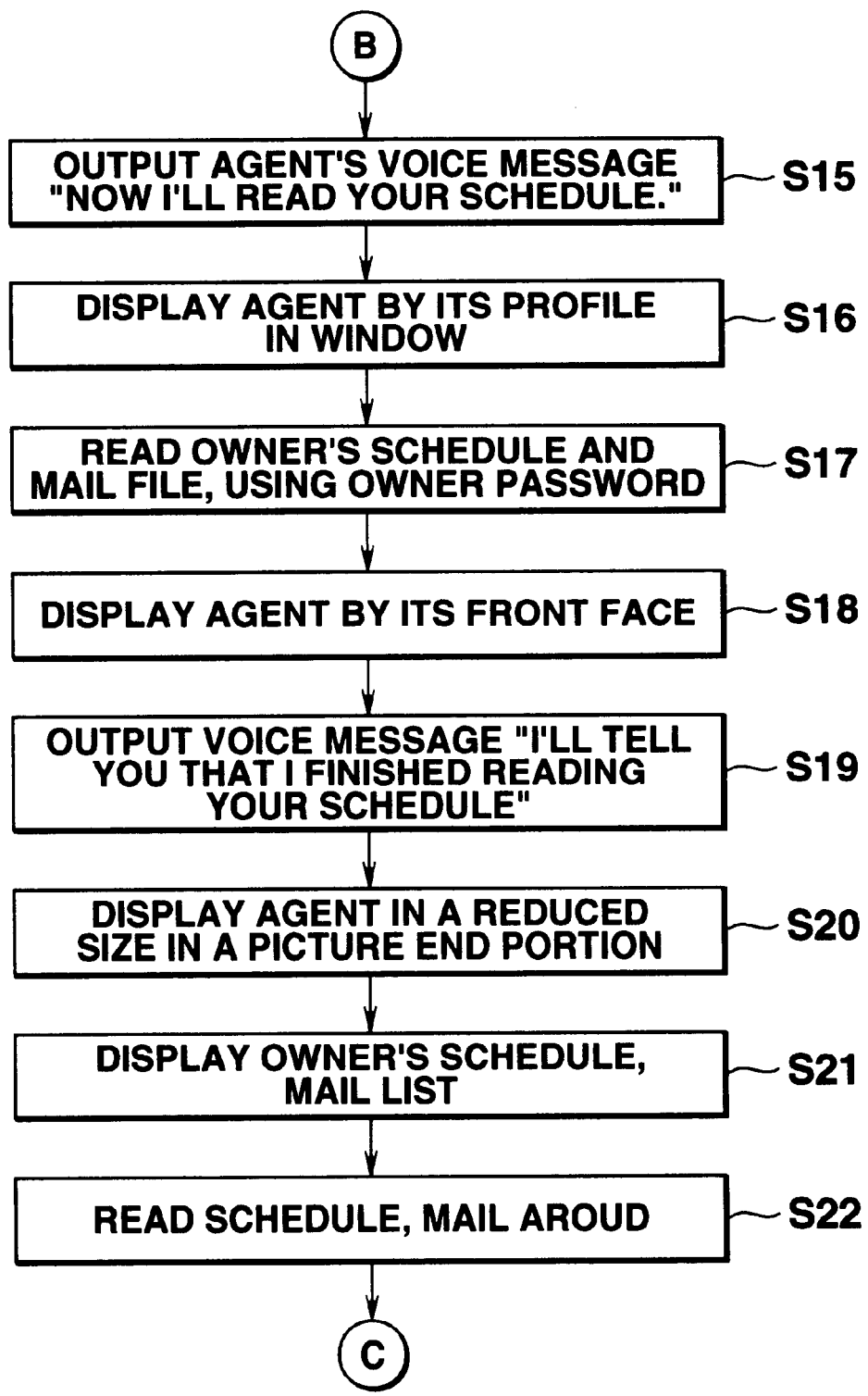

FIG.9

AGENT TABLE

| |
|---|
| OWNER'S VOICE INFORMATION |
| SECRETARY AGENT INFORMATION (VOICE, FACE, NAME) |
| PROXY AGENT INFORMATION (VOICE, FACE, NAME) |
| OWNER INFORMATION<br>( SCHEDULE FILE NAME, MAIL FILE NAME, OWNER'S PRIVATE FILE, OWNER PASSWORD, OWNER'S PREFERENCE INFORMATION ) |

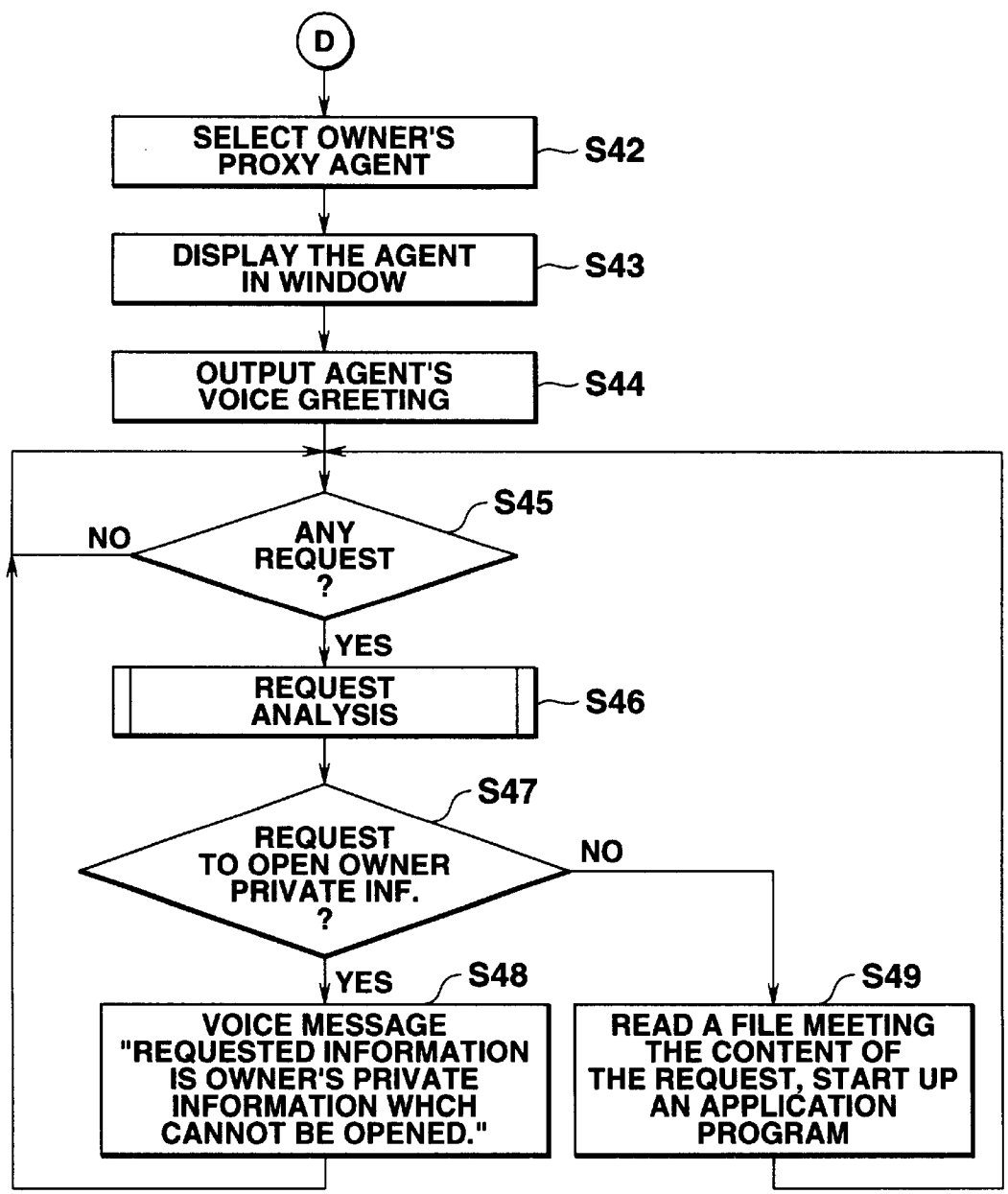

FIG.13

TIME BAND SET TABLE 17a

| DAY OF THE WEEK, TIME BAND | AGENT |
|---|---|
| MONDAY~FRIDAY, 7~17 O'CLOCK | A, C, E |
| MONDAY~FRIDAY, 17~2 O'CLOCK | B, D |
| SAT, SUN, NATIONAL HOLIDAY, ALL TIME | F |

FIG.14

AGENT PERMISSION TABLE 17b

| AGENT | AGENT PROCESSABLE TABLE |
|---|---|
| A | JOB-RELATED SCHEDULE, CUSTOMER ADDRESSES, INFORMATION ON ACCESS TO SERVERS IN INTRA-COMPANY NETWORK, BUSINESS-RELATED DOCUMENT FILE |
| B | INDIVIDUAL SCHEDULE, INDIVIDUAL ADDRESS, INFORMATION ON ACCESS TO AGENT'S OWN HOME SERVER, INDIVIDUAL CREATED FILE |
| C | ⋮ |
| ⋮ | ⋮ |

FIG.15

AGENT'S INDIVIDUAL INFORMATION TABLE 17c

| AGENT | INDIVIDUAL INFORMATION |
|---|---|
| A | VOICE, FACE, NAME, ICON IMAGE |
| B | " |
| C | " |
| ⋮ | " |

FIG.16

MESSAGE TABLE 17d

| TIME BAND | GREETING MESSAGE SENTENCE |
|---|---|
| 5~11 O'CLOCK | "GOOD MORNING." |
| 11~18 O'CLOCK | "GOOD MORNING." OR "GOOD AFTERNOON." |
| 18~5 O'CLOCK | "GOOD EVENING." |

INFORMATION PROCESSORS HAVING AN AGENT FUNCTION AND STORAGE MEDIUMS WHICH CONTAIN PROCESSING PROGRAMS FOR USE IN THE INFORMATION PROCESSOR

BACKGROUND OF THE INVENTION

1. Technical Field

The present invention relates to an information processor which has a secretary agent function of identifying an accesser to the processor and performs a process on behalf of the accesser.

2. Related Art

Recently, as businesses have become more information oriented, personal computers have become vital tools. It is commonplace to see one computer per employee. Also, within a company, the various information obtained by dispersed work using each individual's personal computer is compiled and then used jointly. Thus, the use of a LAN (Local Area Network) as the computer network is also becoming rapidly more and more widespread as a means to improve work efficiency.

Furthermore, along with the spread of computer networks, communication between employees via E-mail has greatly increased because of the LAN. In comparison to the company's LAN, in-home personal computers equipped with a communication function or portable information terminals (hereinafter referred to as PDAs (Personal Digital Assistants) carried by the owners are usable to access the company's LAN through the public circuit network enabling them to send and receive E-mails.

In addition, information service networks are also rapidly gaining popularity in which one can use a computer's communication network such as an Internet to access an information service center via a personal computer and a PDA to obtain desired information or reserve tickets, etc.

As the structure of computer communication networks or information service networks composed of a LAN become diversified and increasingly hierarchical, the steps which the user (or owner) must take to access the desired information tend to become increasingly complex. This, however, has become an obstacle to the novice user at computer operation, as opposed to the seasoned user when the novice user uses the network.

Therefore, as it is the novice users who possess or use much of the computers and PDAs, development of access software to allow them to access desired information easily via the network has increased. In order to further upgrade this access software, access software with an agent function have recently been developed and put to the practice.

When this agent function equipped software is introduced into the personal computer and PDA to access the network, it will also be introduced into the server's side of the network which provides the needed information. In response to a simple request by the user, the terminal agent automatically accesses the server within the computer network to cooperate with the server's agent to execute transaction, for example, automatically select necessary information depending on the accessing user, to display the owner's personal schedule if the accessing user is the owner of the terminal, to appropriately deal, in behalf of the owner of the terminal, with the accessing user if the same user is not the owner of the terminal, and to maintain the owner's private information. That is, the software is intended to reduce the user's burden on the access to the network and execute the user's private secretary's transactions in behalf of the user.

Such conventional accessing software having an agent function is intended to cause the agent to execute a personal secretary business which includes reducing the user's operative load for accessing the network while dealing appropriately with a user, other the owner, who has accessed to the terminal. However, in order to realize the proxy business, the following is insufficient.

In the private secretary's proxy business, the agent has accumulated information on a flow of user's business/individual's preference to reduce a load on the user's operation. When a single agent is used by a plurality of users, basic matters of the agent cannot be set in environments which are easy for the individual users to use, and hence the utility of the agent's functions is reduced due to a decrease in user friendliness.

In the conventional accessing software having the agent function, there is basically only one agent for a single user. The proxy business which that agent takes a charge of may cover many various transactions which contain secretary transactions on businesses such as processing of various information items, and business schedule and customer address management, and personal secretary business such as non-business individual schedule management. Thus, the number of the user's instructions or requests increases which is necessary for the user to give by the time when the agent executes a proxy business in behalf of the user. The load on the agent increases. Simultaneously, the load increases which the user processes by the time when the agent executes the proxy business in behalf of the user. Thus, the agent's function cannot rapidly deal with the user's request or instruction as the case may be.

SUMMARY OF THE INVENTION

It is therefore an object of the present invention to provide a plurality agents which are each used by a corresponding accessing user and which each identify an accessing user, perform a user's proxy business, and handles even user's special preference to smooth the agent's response to the user's request to thereby utilize the agent function of the accessing software effectively.

Another object of the present invention is to selectively use a plurality of speciality- and time-divided agents to reduce a load processed by a respective one of the agents by the time when a proxy business which the user desires is performed, to cause the respective agent to rapidly deal with the corresponding user's request, rapidly report required information and rapidly perform a process meeting the request.

In order to achieve the above objects, according to the present invention, there is provided an information processor which includes a plurality of agents each for performing in behalf of a user a process which meets a respective one of the user's various requests in accordance with that request, comprising:

information storing means which contains user information in which a plurality of users is placed in corresponding relationship to a plurality of agents, and a plurality of expression information items each peculiar to a respective one of the plurality of agents;

input means operated by a user for providing a respective one of the user's various processing requests;

identifying means for identifying the user based on the content of that request provided by the input means and the user information; and responding means for selecting an agent corresponding to the identified user from the user information stored in the information storing means, and for responding to the processing request provided by the input means on the basis of expression information peculiar to the agent contained in the information storing means.

According to this information processor, a proxy business pertinent to the user is executed in behalf of the user by the business proxy function provided for the user. Thus, the user is able to execute the required processing smoothly without feeling complication due to the problem with setting of the proxy processing function and a feeling of wrongness with the sense of sight and auditory sense.

In order to achieve the above objects, according to the present invention, there is also provided an information processor which includes a plurality of agents each for performing in behalf of a user a process depending on the content of a respective one of the user's various requests in accordance with that request, comprising:

information storing means which contains a plurality of expression information items each peculiar to a respective one of the plurality of agents, and a plurality of user information items each on a user which monopolizes a respective one of the plurality of agents;

input means operated by the user for providing a respective one of the user's various processing requests;

determining means for determining whether the user is the one who monopolizes a corresponding one of the plurality of agents based on the content of that request provided by the input means and the plurality of user information items; and responding means for responding to the processing request provided from the input means by the determined monopolizing user on the basis of expression information peculiar to the agent contained in the information storing means.

According to this information processor, a user information item on the monopolizing user is referred to while the required processing is performed by the proxy processing function corresponding to the monopolizing user. Thus, even the peculiar preference and habits of the monopolizing user are dealt with while the required proxy processing is performed. Thus, the monopolizing user is able to perform the required processing smoothly.

In order to achieve the above objects, according to the present invention, there is also provided an information processor having a plurality of agents each for performing in behalf of a user a process depending on a respective one of a user's various processing requests, comprising:

expression information storing means which contains for the plurality of agents a corresponding plurality of peculiar expression information items each for expressing features of a respective one of the plurality of agents;

input means for selecting one of the plurality of agents and for providing a respective one of the user's various processing requests; and responding means responsive to the input means selecting an agent for getting from the expression information storing means expression information peculiar to the selected agent to make to the user a response to characterize the agent and for responding to the respective processing request provided by the input means on the basis of the peculiar expression information.

According to this arrangement, when a required proxy processing function meeting the user's request is selected from among the plurality of proxy processing functions, the user's request is responded on the basis of the expression information item peculiar to the selected proxy processing function. Thus, a proxy processing function is selected in accordance with the content of the request to thereby report required information and give a respective one of various indications rapidly, using the peculiar information.

In order to achieve the above objects, according to the present invention, there is also provided an information processor which includes a plurality of agents each for performing a process responding to a respective one of various processing requests, comprising:

information storing means which contains for the plurality of agents a corresponding plurality of peculiar expression information items each different in a peculiar image or peculiar voice which characterizes a respective one of the plurality of agents and which has set a plurality of time divisions each such as a date or time corresponding to a respective one of the plurality of agents;

input means for providing a respective one of the various processing requests; and responding means responsive to the input means providing one of the various processing request for selecting from the information storing means an agent for a time division corresponding to a time when the processing request was provided by the input means, for getting from the expression information storing means peculiar expression information corresponding to that agent, and for responding to the processing request in an expression form based on the peculiar image or voice of that agent.

According to this information processor, peculiar images representing corresponding proxy processing functions available in the present time are displayed. When a proxy processing function meeting the content of the request is selected, the proxy processing function responds to the request in a voice peculiar to the selected proxy processing function. Thus, a proxy processing function is selected depending on the content of the request from among the proxy processing functions corresponding to the respective time divisions. Thus, the respective proxy processing functions are selectively and properly used depending on the user's action pattern and the proxy processing function corresponding to the time division is easily recognized.

BRIEF DESCRIPTION OF THE DRAWINGS

FIG. 3 shows the set contents of data on an agent table stored in a storage device 17;

FIG. 4 shows the contents of agent set information stored in the storage device 17;

FIG. 7 is a flow chart portion continued to that of FIG. 6;

FIG. 9 shows the content of data set on an agent table stored in the storage device 17;

FIG. 11 is a flow chart portion continued to the flow chart of FIG. 10;

FIG. 13 shows the contents of data set on a time band setting table 17a stored as one of various tables in the storage device 17;

FIG. 14 shows the contents of data set on an agent permission information table 17b stored as one of the various tables in the storage device 17;

FIG. 15 shows the contents of data set on an agent individual information table 17c stored as one of the various tables in the storage device 17;

FIG. 16 shows the contents of data set on a message table 17d stored as one of the various tables in the storage device 17;

DETAILED DESCRIPTION

<First Embodiment>

Figure 1:
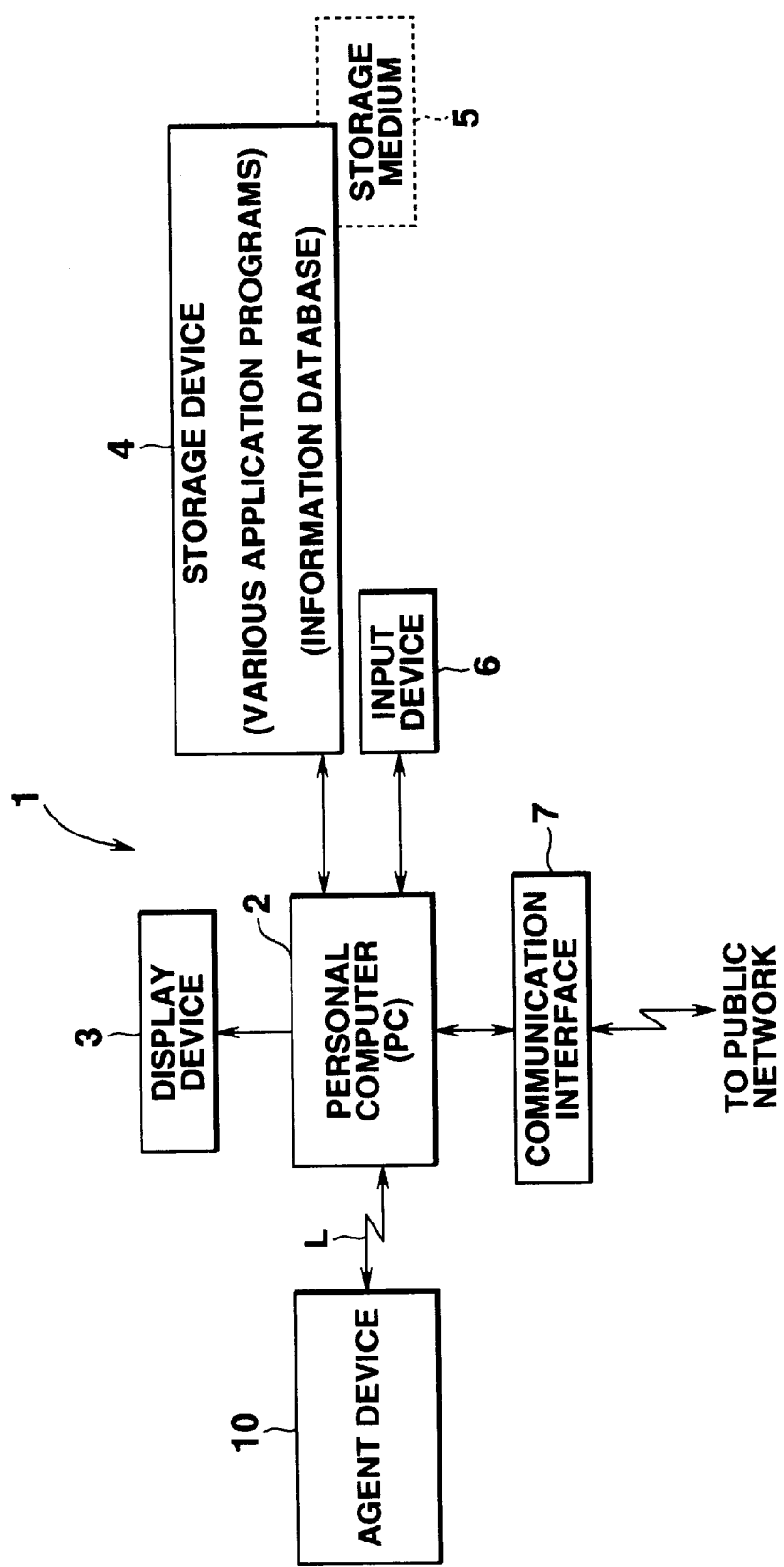
FIG. 1 shows a whole composition of a computer system which includes an agent device 10 as a first embodiment of an information processor and recording medium according to the present invention.

FIGS. 1–8 show a computer system which includes a first embodiment of an information processor according to the present invention. FIG. 1 illustrates a whole composition of the information processor, in which a processing computer 1 is connected via a data line L to an agent device 10. The processing computer 1 is composed of a personal computer (PC) 2, a display device 3, a storage device 4, a storage medium 5, an input device 6, and a communication interface 7.

The personal computer 2 stores an application program, selected from among a system program and corresponding various application programs contained in the storage device 4, in a program storage area in a built-in RAM (Random Access Memory) (not shown), stores in the RAM data/respective instructions or requests entered from the input device 6, performs various processing operations on the basis of the input data/instructions or requests in accordance with the application program stored in the RAM, stores the result of the processing operations at appropriate addresses in the storage device 6 specified by the input device 3, and displays the result of the processing operations on the display device 3.

The personal computer 2 retrieves various information in an information data base of the storage device 4 in response to a request to start up an application program for information retrieval, a request to transfer extraction condition items, received via the data line L from the agent device 10, and transfers data on the result of the processing operation to the agent device 10.

The personal computer 2 accesses via the communication interface 7 and a public network to an external processing computer (not shown), and requests the processing computer to retrieve information in response to a respective one of various requests for information retrieval received via the data line L from the agent device 10, and receives the result of the information retrieval from the external processing computer and transfers the result of the information retrieval to the agent device 10.

The display unit 3 is composed of a CRT (Cathode Ray Tube) or liquid crystal display panel which displays data received from the personal computer 2 and which displays the request and retrieval information to be transferred in the respective processing operation corresponding to the information retrieval request performed by the personal computer 2.

The storage device 4 includes a storage medium 5 which is composed of a magnetic or optical recording medium or a semiconductor memory provided fixedly or removably therein which contains/stores the system program, various corresponding application programs, communication program, information data bases, and data processed by the respective processing programs.

Program/data such as are contained/stored in the storage medium 5 may be received from other devices via the public network and the communication interface 7. Alternatively, such data may be received via the public network and a communication line from a storage device which includes a storage medium provided on another device which contains/stores programs/data.

The input device 6 is provided with cursor keys, numeral input keys and various function keys which enter respective signals generated when depressed into the personal computer 2. The communication interface 7 is connected via the public network to the external processing computer in accordance with a request for communication received from the personal computer 2, sends/receives information to/from the external processing computer and transfers received information to the personal computer 2.

Figure 2:
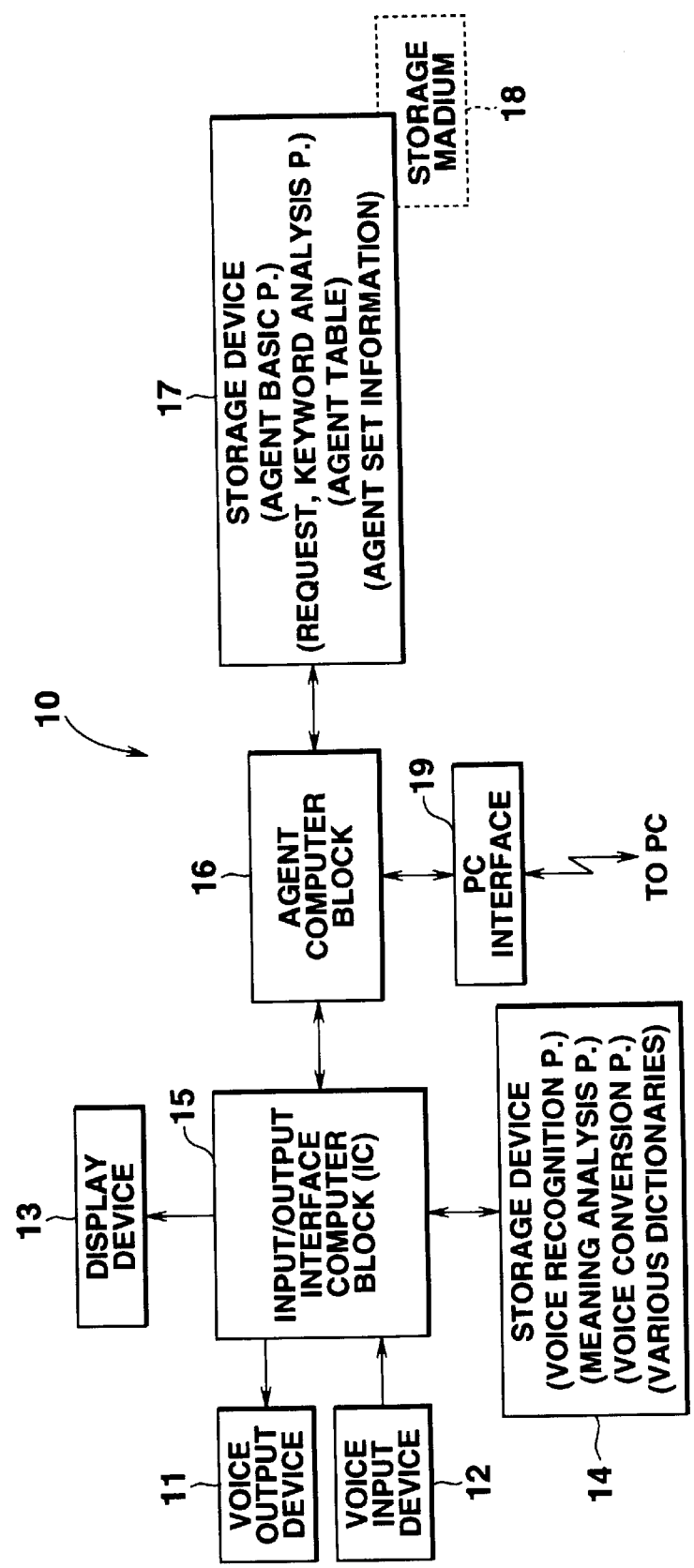
FIG. 2 is a block diagram of an essential portion of the agent device 10.

Referring to FIG. 2, the agent device 10 of FIG. 1 will be described in more detail. In FIG. 2, the agent device 10 is composed mainly of an input/output interface computer block (IC) 15 and an agent computer block 16. The input/output computer block 15 is connected to a voice output device 11, a voice input device 12, a display device 13 and a storage device 14. The agent computer block 16 is connected to a storage device 17, a storage medium 18, and a personal computer (PC) interface 19.

The voice input device 12 converts an inputted user's voice request to voice request data. The input/output interface computer block 15 recognizes the content of the voice request data in accordance with a voice recognition program stored in the storage device 14, analyzes the classification and meaning of a request for information retrieval on the basis of the recognized voice request data in accordance with a meaning analysis program stored in the storage device 14, and feeds the result of the analysis to the agent computer block 16.

When the input/output interface computer block 15 receives information on candidates retrieved by the agent computer block 16 on the basis of the classification and meaning of the request fed to the agent computer block 16, the input/output interface computer block 15 converts the information on candidates to speech data in accordance with a speech conversion program stored in the storage device 14, and outputs corresponding candidate information audibly via the voice output device 11.

The voice output device 11 performs a D/A conversion process on the speech data received from the input/output interface computer block 15 and outputs the resulting data in the form of a voice message from a built-in speaker.

The voice input device 12 performs an A/D conversion process on a user's voice request inputted via a built-in microphone therein and feeds the resulting voice data to the input/output interface computer block 15.

The display device 13 is composed of a CRT or a liquid crystal display panel which displays data received from the input/output interface computer block 15 and also displays the voice request/retrieved information received in the process corresponding to the information retrieval request executed by the agent computer block 16.

The storage device 14 contains the voice recognition program, meaning analysis program, voice conversion program and various dictionary data used in the meaning analysis, which are executed by the input/output interface computer block 15.

The agent computer block 16 selects an agent corresponding to an accessing user on the basis of voice data provided by the input/output interface computer block 15 and an agent table, on which a plurality of agents is recorded, stored in the storage device 17, reads out from the storage device 17 agent set information on the selected agent, and transfers this information to the input/output interface computer block 15, displays the agent's peculiar figure (mainly, face) on the display device 13 in accordance with the agent set information, and outputs a message in the agent's peculiar voice from the voice output device 11.

After selection of the agent corresponding to the user, the agent computer block 16 carries out various secretary proxy businesses in user's behalf based on the agent basic program stored in the storage device 17. Specifically, the agent computer block 16 analyzes the user's request, sends the personal computer 2 a request to start up an application program involved in the user's request. When the agent computer block 16 receives from the personal computer 2 information on the user's request obtained by the started-up application, it transfers the information to the input/output interface computer block 15, displays the information on the display device 13 and also provides the user with the information in the form of a voice message from the voice output device 11.

The storage device 17 includes a storage medium 18 composed of a magnetic or optical recording medium or a semiconductor memory provided fixedly or removably in the storage device 17 and contains an agent basic program, other various programs such as request and analysis programs corresponding to the agent basic program, executed by the agent computer block 16, and various set files which are an agent table (FIG. 3) in which a plurality of agents is set in correspondence to a plurality of users, and an agent set information file which contains a plurality of pairs of agent's peculiar information item (on agent's face, voice, name, etc.) and an owner's information item containing an owner's preference information item, etc.

Programs/data such as those stored in the storage device 18 may be received from a different device or a storage device which may include a storage medium such as is provided on the different device, connected via the personal computer (PC) interface 19 and the public network to the present information processor.

In operation, a process including agent selection through private secretary proxy business processing executed by the agent computer block 16 will be next described with reference to the flow chart of FIGS. 5–7. In the first embodiment, an agent device 10 is provided with a plurality of agents each for a respective one of users. For selection of an agent, the storage 17 in the agent computer block 16 contains the agent table of FIG. 3 and the agent set information file of FIG. 4.

A particular user corresponding to a specified agent is hereinafter referred to as an owner of the agent. Note that the word "owner" points to the owner of the specified agent if not specified otherwise.

As described above, the agent table of FIG. 3 contains a plurality of owner's voice information items each to identify an accessing user by his or her voice and a corresponding plurality of agent information items.

As described above, the agent set information table of FIG. 4 contains for a plurality of agents a corresponding plurality of pairs of agent peculiar information item on an agent's face, voice, name, etc., and related owner's information item on a schedule name, mail name, owner's private file name, owner's preference information, owner's password, etc. The "agent set information item" and "owner's information item" are freely settable by the owner to thereby arrange those information items, inclusive of visual display and auditory output aspects of an agent who the owner is easy to use.

Figure 5:
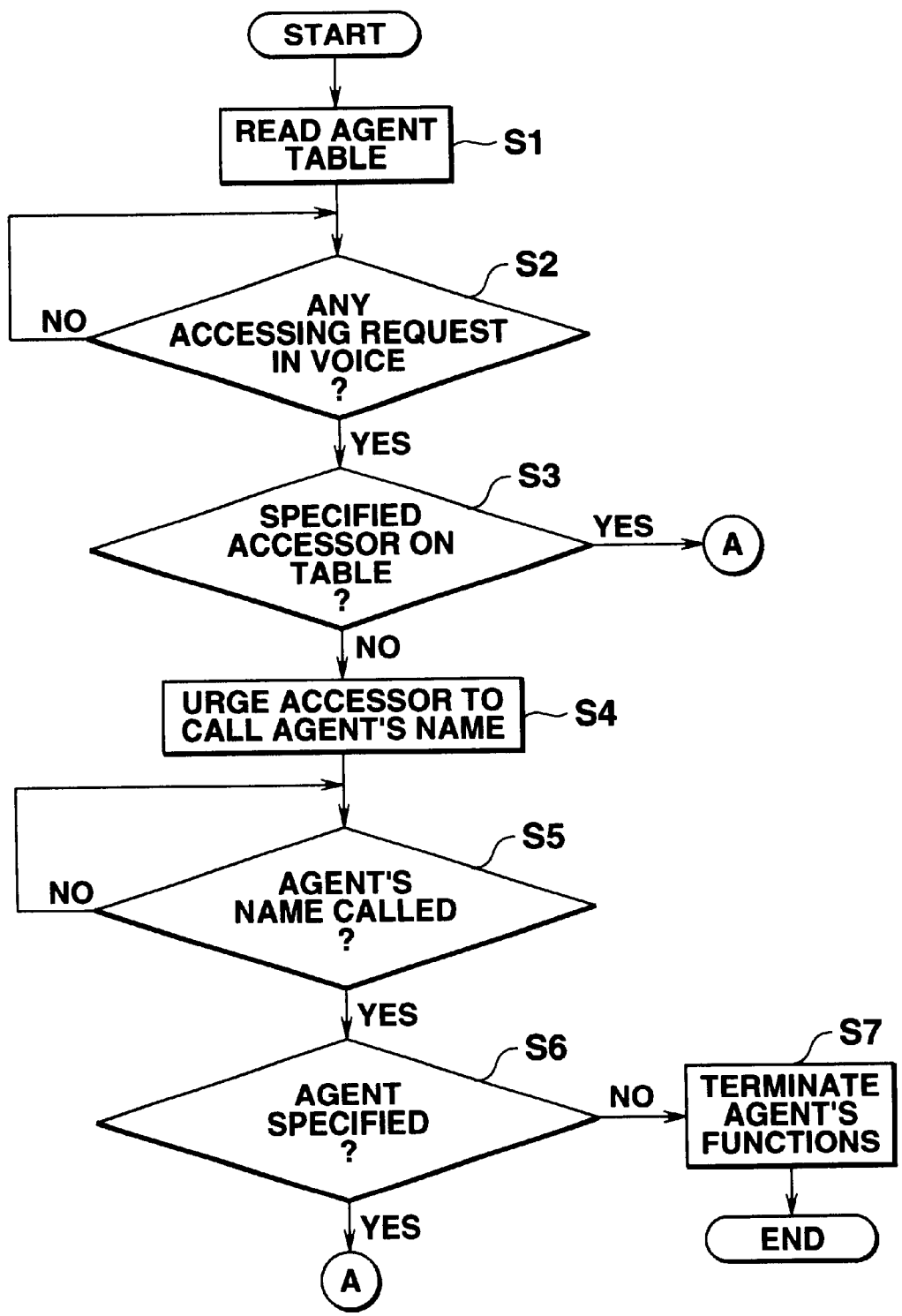
FIG. 5 is a flow chart of a part of a process which includes agent selection through secretary processed business performed by an agent computer block 15.
Figure 6:
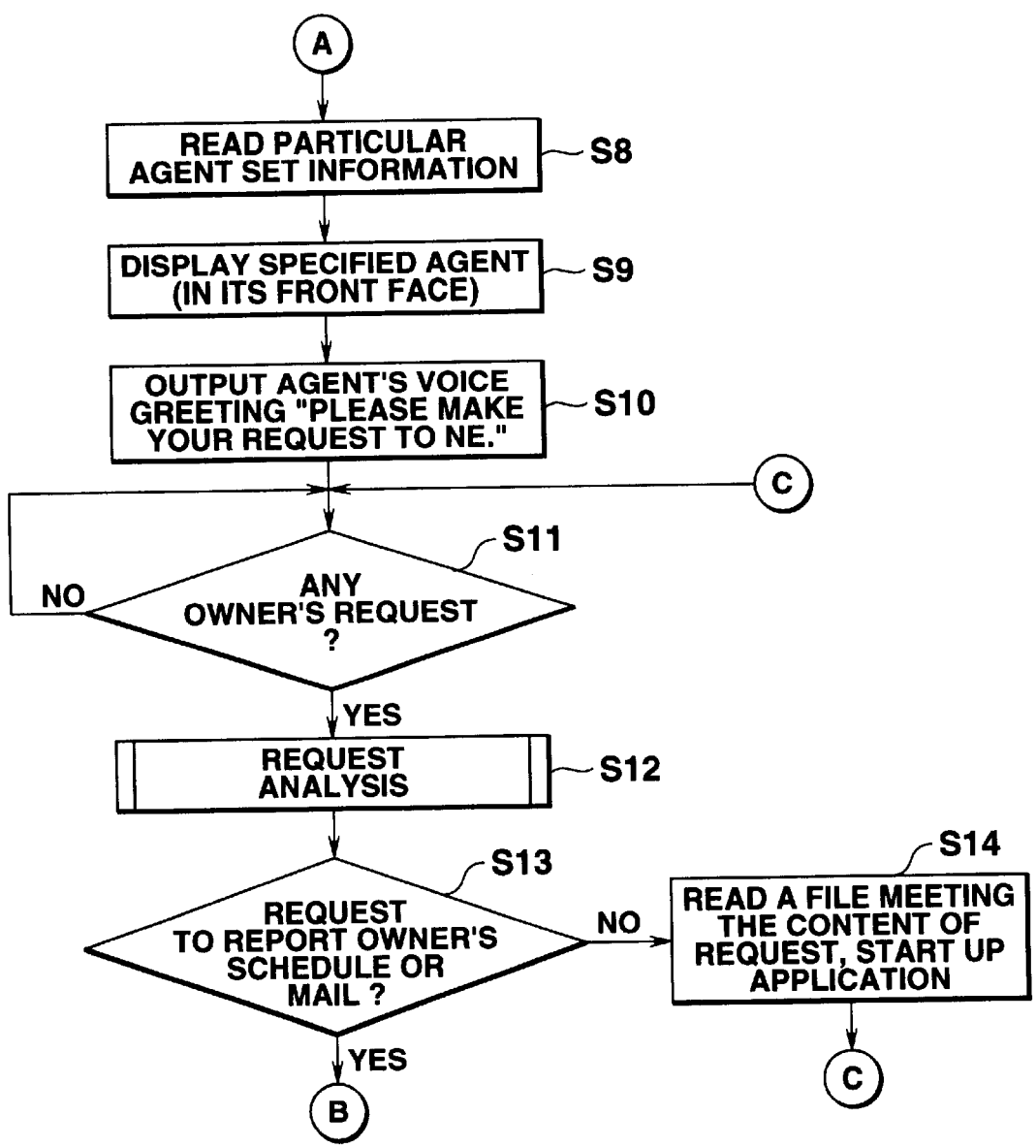
FIG. 6 is a flow chart portion continued to the flow chart of FIG. 5.

In FIG. 5, first, the agent computer block 16 reads into a built-in memory (not shown) thereof the agent table of FIG. 3 stored in the storage device 17 of the agent computer block 16 (step S1). When this reading ends, the agent computer block 16 waits for incoming voice data based on a voice request from the input/output interface computer block 15 (step S2). More particularly, the agent computer block 16 determines whether there is incoming voice data representing owner's voice request provided by the voice input device 12 and recognized by the input/output interface computer block 15.

The accessing user says, for example, "Good morning." to the agent device 10. Alternatively, the user may speak in a conjunctive word such as "Now," which has no specified meaning. When some voice uttered from the accessing user is inputted into the voice input device 12 and the corresponding voice data is inputted to the input/output interface computer block 15, the input/output interface computer block 15 analyzes the inputted voice data on the basis of the voice recognition program stored in the storage device 14, and specifies the speaker or accessing user (step S3). At this time, the agent computer block refers to the agent table (FIG. 3) reads into the built-in memory (not shown) of the agent computer block 16 in which the plurality of "owner's voice information" items and the corresponding plurality of "agent" information items are set as related items.

Thus, when the accessing user is specified successfully, an agent corresponding to that user is selected based on the agent table and the agent set information (FIG. 4) on the agent is read into the built-in memory of the agent computer block 16 (step S8). When the agent table contains no information on the accessing user and no accessing user can be specified, the agent computer block 16 outputs a message which urges the user to specify an agent by its peculiar name, for example, "Please, specify an agent by its name." To this end, the agent computer block 16 transfers a control signal to output the message to the input/output interface computer block 15 and displays the message on the display device 13 in the form of characters and outputs the voice message audibly from the voice output device 11 (step S4).

Then, the computer block 16 waits for incoming voice recognition character data based on a voice request from the input/output interface computer block 15 (step S5). More particularly, the agent computer block 16 determines whether the voice specifying the owner's agent provided by the voice input device 12 is recognized by the input/output interface computer block 15 and hence whether there is relevant voice recognition character data inputted to the agent computer block 16.

If so, the agent computer block 16 specifies the agent whose peculiar name was specified by the user, based on the agent table read into the storage 17 of the agent computer block 16 (step S6). If the agent is specified successfully, the agent computer block 16 reads the agent set information on the agent of FIG. 4 into the built-in memory thereof (step S8). If the agent cannot be specified, the agent computer block 16 terminates the agent function based on the agent basic program stored in the storage device 17 (step S7).

Figure 8A:
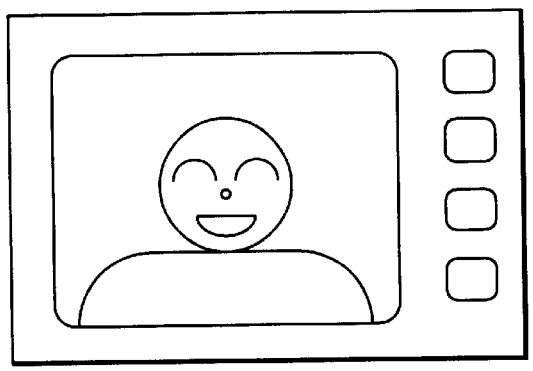
FIGS. 8A, 8B and 8C are a front view of an agent who waits for a request, a side view of the agent who is dealing with a required business, and a front view of a reduced-size agent and the required information, respectively.

When the agent computer block 16 reads the agent set information on the agent specified by the user at step S8, it displays the specified agent in its front image such as is shown in FIG. 8A on the display device 13 in accordance with the read agent set information (step S9), and outputs from the voice output device 11 a greeting voice message such as "Good morning. I am OO. Please give me your request to execute a secretary proxy business." (step S10). Thereafter, the agent computer block 16 waits for incoming voice recognition character string data based on a voice request from input/output interface computer block 15 (step S11). More particularly, the agent computer block 16 determines whether the owner's voice request to execute a secretary proxy business provided by the voice input device 12 is recognized by the input/output interface computer 15 and hence whether there is corresponding voice recognition character string data inputted to the agent computer block 16.

Assume now that the owner's request or request is "My today's schedule?". When the agent computer block 16 receives voice recognition character string data from input/output interface computer block 15, the agent computer block 16 causes the input/output interface computer block 15 to analyze the meaning of the character string data and classify the request (step S12), and determines on the basis of the result of the analysis and classification whether the request is to report the owner's personal schedule/mail (step S13). The request can be classified according to a keyword to the character string data. In the above example, there is a keyword "schedule", so that the agent computer block 16 determines at step S13 that the request is naturally to report the owner's schedule.

Figure 8B:
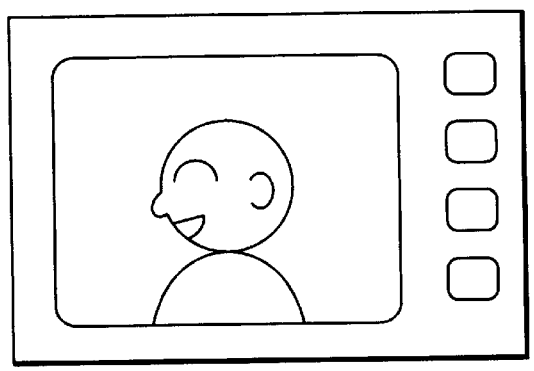

Then, the agent computer block 16 transfers the voice message data to the input/output interface computer block 15 to cause the voice output device 11 to provide a voice message "Now, I'll read your schedule." (step S15). Simultaneously, during reading the schedule, the agent computer block 16 displays on the display device 13 a side view of the agent such as is shown in FIG. 8B to indicate that the agent cannot react to another request now (step S16), and uses an owner's password which the agent computer block 16 is authorized to read because of the secretary agent to start to read the owner's schedule data from the storage device 17 of the agent computer block 16 (step S17).

When this reading is completed, the agent computer block 16 causes the input/output interface computer block 15 to control the display device 13 and the voice output device 11 so that the agent displayed on the display device 13 acts as shown below and outputs a voice message.

Figure 8C:
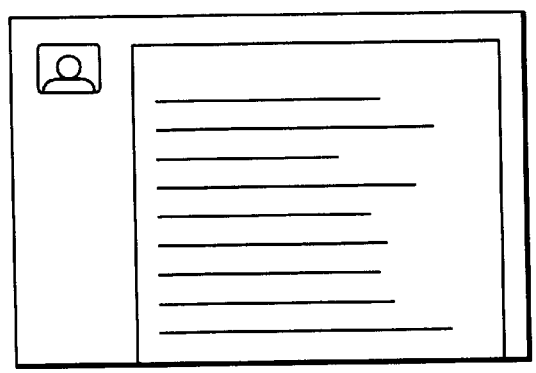

More specifically, when the agent computer block 16 has read the owner's schedule, the agent computer block 16 returns the picture to the agent's front view (step S18) and causes the owner to utter a voice message, "I'll report that I have just completed reading the owner's schedule." (step S19), then displays a front view of a reduced-sized agent as shown in FIG. 8C (step S20), displays the owner's schedule on the display device (step S21), and then reads the content of the owner's schedule (step S22) around.

After step S22 at which the owner has confirmed the schedule, the agent computer block 16 waits for incoming voice recognition character data based on a voice request from the input/output interface computer block 15 at step S11. More specifically, the input/output interface computer block 15 recognizes the owner's voice request, to execute a secretary proxy business, provided by the voice input device 12 and the agent computer block 16 determines whether there is voice recognition character data inputted to the agent computer block 16. If so, the agent computer block 16 causes the input/output interface computer block 15 to analyze the meaning of the character string data and to classify the request indicated by the character string data (step S12). When the agent computer block 16 determines from the result of the analysis and the classification that the request is not for reporting the owner's personal schedule or mail, the agent computer block 16 reads a file meeting the request and sends an application starting-up request signal via the personal computer (PC) interface 19 to the personal computer 2 to cause same to perform the respective processing operations meeting the request (step S14).

When the agent computer block 16 then terminates the processing for responding to the owner's request, it returns to waiting for an incoming owner's request at step S11, which is repeated.

While in the first embodiment the agent table and the agent set information file are illustrated as being stored in the storage device 17 of the agent computer block 16, they may be stored in the storage device 4 of the personal computer 2 as a so-called server because data in the agent table and agent set information file are common to all the agent devices connected via the line L to the personal computer 2 and not peculiar to each of the agent processors. Thus, those data may be stored in the storage device 4 of the personal computer 2, which is effective because the storage medium in the storage device is usable effectively.

As described above, the agent computer block 16 of the agent device 10 provided in the computer system of the first embodiment selects an agent corresponding to the accessing user based on the agent table stored in the storage device 17 where the plurality of agents are recorded and the voice recognition character data provided by the input/output interface computer block 15, reads from the storage device 17 the agent set information on the selected agent, transfers this information to the input/output interface computer block 15, displays the agent's peculiar figure (mainly, face) on the display 13 in accordance with the agent set information, and outputs a message in a voice peculiar to the agent from the voice output device 11.

After selecting the agent corresponding to the user, the agent computer block 16 executes various secretary businesses in user's behalf on the basis of the agent basic program stored in the storage device 17. More specifically, the agent computer block 16 analyzes the user's request and sends a request to start up an application program involved in the user's request to the personal computer 2. When the agent computer block 16 receives from the personal computer 2 the information on the user's request obtained by execution of the started-up application, the agent computer block 16 transfers this information to the input/output interface computer block 15, displays it on the display device 13, and sends the user the information in a voice message from the voice output device 11.

Thus, the agent device 10 of the first embodiment identifies the accessing user based on the user's voice information, so that when the user whose voice information is set on the agent table accesses the corresponding agent, a process to be performed for security such as entering the owner's password is omitted to thereby achieve an improved log-in process in the access.

In the agent device 10 of the first embodiment, the plurality of agents corresponding to the plurality of owners is provided and a peculiar agent corresponding to accessing user is automatically selected based on the agent table. Thus, the owner is free to set "agent's peculiar information" such as the agent's peculiar face, voice, name, . . . and "owner information", and the owner is able to arrange and set the information items on the agent and the visual display/auditory output aspects of the agent so that the agent is easy for the owner to use, and hence the user is able to access the agent smoothly without feeling that something is wrong with the agent.

The agent device 10 of the first embodiment displays the agent's front image when the agent waits for a request, displays its side or profile image when the agent cannot react to a request because the agent is at work, and displays a reduced-sized agent's front image in the display end portion when there is displayed information (such as, for example, a schedule) to be presented to the accessing user. That is, since the displayed agent's figure varies depending on the situation, the accessing user easily recognizes the accessing situation visually.

<Second Embodiment>

As described above, the agent computer block 16 of the agent device 10 provided in the computer system of the first embodiment selects an agent corresponding to the accessing user based on the agent table stored in the storage device 17 where the plurality of agents are recorded, on the basis of the voice recognition character data inputted by the input/output interface computer block 15, reads from the storage device 17 the agent set information on the selected agent, transfers this information to the input/output interface computer block 15, displays the agent's peculiar figure (mainly, face) on the display 13 in accordance with the agent set information, and outputs a message in a voice peculiar to the agent from the voice output device 11. If two agents are set in a particular owner's agent device 10, it is effective that the two agents are set as an owner's private secretary agent who executes the owner's secretary proxy business and a proxy agent which deals with accesser other than the owner in behalf of the owner More particularly, the agent computer block 16 of the agent device 10 provided in the computer system of a second embodiment selects the owner's private secretary agent when the accessing user is the owner, and the selects the proxy agent in behalf of the owner when the accessing user is one other than the owner, on the basis of the voice data provided by the input/output interface block 15 and the agent table stored in the storage device 17, reads from the storage device 17 information on the selected agent, transfers this information to the input/output interface computer block 15, display the agent's peculiar figure (manly, face) on the display 13 in accordance with the agent set information, and outputs a message in the agent's peculiar voice from the voice output device 11.

In the second embodiment, the owner's particular agent device 10 which includes the secretary agent and proxy agent will be described next with reference to the flow charts of FIGS. 10 and 11. Since the personal computer 2 and agent device 10 of the computer system of the second embodiment are the same in composition as those of FIGS. 1 and 2 of the first embodiment, further description and illustration thereof will be omitted.

An agent selection through personal secretary proxy business execution process executed by the agent computer block 16 will be described next with reference to the flow charts of FIGS. 10 and 11. In the second embodiment, in order to deal with the agent selection depending on whether the accessing user is the owner or a user other than the owner, an agent table of FIG. 9 is stored in the storage device 17 of the agent computer block 16. A particular user who is the owner of the agent device 10 is called hereinafter the owner of the agent device 10. If not specified otherwise, the "owner" should merely point out the owner of the specified agent device 10.

Set and related on the agent table of FIG. 9 are "owner's voice information" to determine based on an accessing user's voice whether the user is the owner or not, "secretary agent information" on a secretary agent's voice, face, name, etc., "proxy agent information" on the proxy agent's voice, face, name, etc., "owner information" on a schedule name, mail name, owner's private file name, owner's preference information, owner's password, etc. The "secretary agent information" and "owner's information" are freely settable by the owner so as to arrange and set information items on the owner's secretary agent, inclusive of its visual display and auditory output aspects so that the secretary agent is easy for the owner to use. The "proxy agent information" is settable properly so as to deal appropriately with an accessing user other than the owner in the behalf of the owner.

Figure 10:
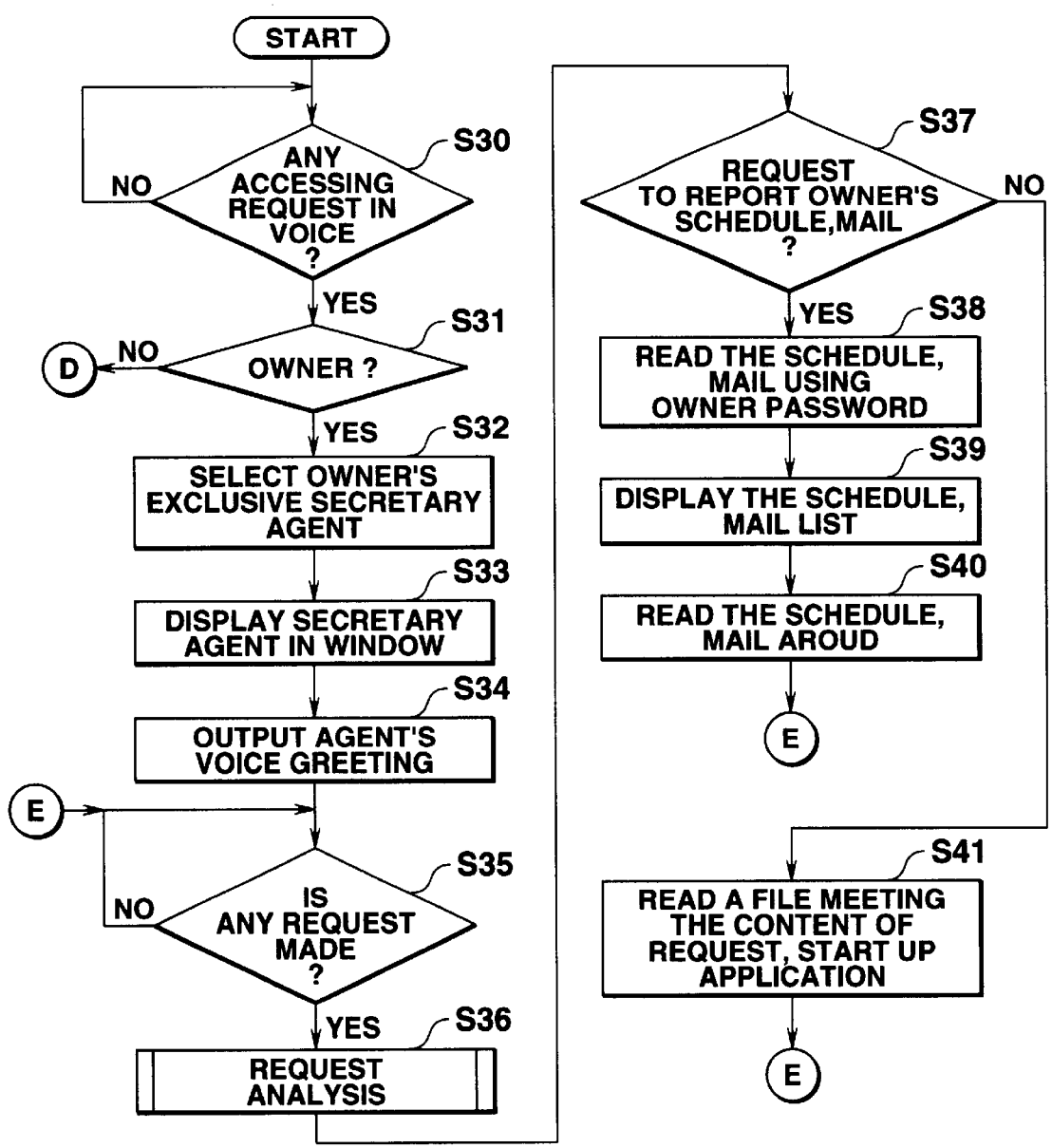
FIG. 10 shows a part of a flow chart of an agent selection-secretary business process performed by an agent computer block 15.

In FIG. 10, first, the agent computer block 16 waits for incoming voice data based on a voice request from the input/output interface computer block 15 (step S30). More particularly, the agent computer block 16 determines whether the owner's voice request provided by the voice input device 12 is recognized by the input/output interface computer block 15 and has been provided as voice data for the agent computer block 16.

As in the first embodiment, the accessing user says, for example, "Good morning" to the agent device 10, or the user may utter a particular conjunctive word such as "Now," having no meaning. As just described above, when some voice uttered by the accessing user is inputted to the voice input device 12 and corresponding voice data is inputted to the input/output interface computer block 15, the input/output interface computer block 15 analyzes the inputted voice data in accordance with the voice recognition program stored in the storage device 14 and determines whether the speaker or the accessing user is the owner (step S31). At this time, the agent computer block 16 refers to the agent table (FIG. 9) on which the "owner's voice information" is set as one item and which is read into the built-in memory (not shown) of the agent computer block 16.

Figure 12A:
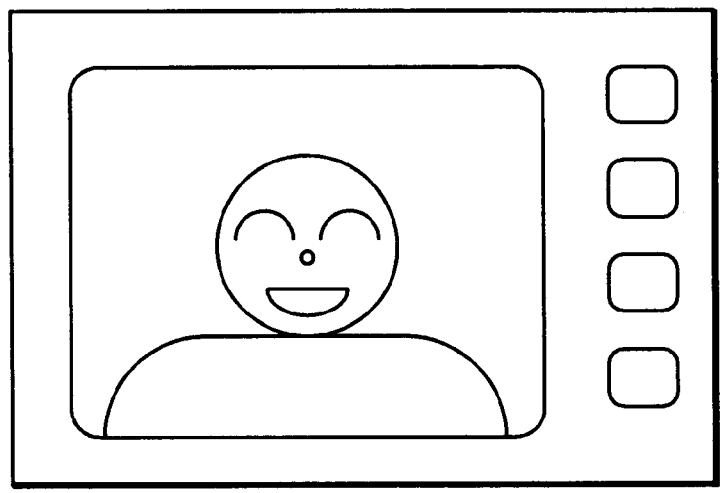
FIGS. 12A and 12B illustrate an owner's private secretary agent and the owner's proxy agent, respectively, displayed on a display device 13.

When the agent computer block 16 determines on the basis of the agent table that the accessing user is the owner, it selects the owner's private secretary agent (step S32), displays the secretary agent in its front image as shown in FIG. 12A on the display device 13 in accordance with the secretary agent information on the agent table read into the built-in memory (step S33), and outputs a greeting voice message such as "Good morning. I am OO, your secretary. Please give me your request." (step S34).

After this message, the agent computer block 16 waits for incoming voice recognition character string data based on a voice request from the input/output interface computer block 15 (step S35). More particularly, the agent computer block 16 determines whether the owner's voice request to execute the secretary proxy business provided by the voice input device 12 is recognized by the input/output interface computer block 15 and inputted as voice recognition character string data to the agent computer block 16.

When the agent computer block 16 receives the voice recognition character string data from the input/output interface computer block 15, the agent computer block 16 causes the input/output interface computer block 15 to analyze the meaning of the character string data and classify the request represented by the character string data (step S36).

The agent computer block 16 then determines on the basis of the result of the analysis and classification whether the request is to report the owner's personal schedule/mail (step S37). If so, the agent computer block 16 performs processes at steps S38, S39 and S40 corresponding respectively to steps s17, S21 and S22 of FIG. 7 and then returns to step S35. If not, the agent computer block 16 performs a process at step S41 corresponding to step S14 of FIG. 6 and then returns to step S35.

Figure 12B:
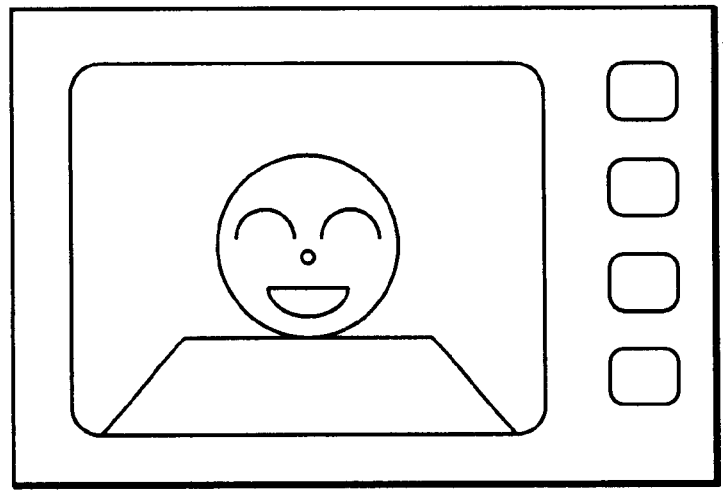

When the input/output interface computer block 16 determines on the basis of the agent table at step S31 that the accessing user is one other than the owner, it selects the proxy agent in behalf of the owner (step S42), displays on the display device 13 the proxy agent in its front image of FIG. 12B different from the secretary agent of FIG. 12A in accordance with information on the proxy agent on the agent table read into the built-in memory (step S43), and outputs from the voice output device 11 a greeting voice message such as "Good morning. I am ΔΔ in behalf of Mr. □□, the owner. Please give me your request." (step S44).

After this message, the agent computer block 16 waits for incoming voice recognition character string data based on a voice instructions or requests from the input/output interface computer block 15 (step S45). More particularly, the agent computer block 16 determines whether the voice request of a user, other than the owner to execute the secretary proxy business, provided by the voice input device 12 is recognized by the input/output interface computer block 15 and inputted as voice recognition character data to the agent computer block 16.

When the agent computer block 16 receives the voice recognition character string data from the input/output interface computer block 15, the agent computer block 16 causes the input/output interface computer block 15 to analyze the meaning of the character string data and classify the request represented by the character string data (step S46).

The agent computer block 16 analyzes the meaning of the voice request, classifies the request involving the voice request, and determines whether the request is to get owner's private information (step S47). The request may be classified by a keyword to the character string data.

When the agent computer block 16 determines at step S47 that the request is to get the owner's private information, the agent computer block 16 transfers voice message data to reject the request to the input/output interface computer block 15, and outputs from the voice output device 11 a voice message "the requested information is the owner's private information, so that it cannot be opened." (step S48). Simultaneously, the agent computer block 16 waits for incoming voice recognition character data based on the voice request from the input/output interface computer block 15 at step S45.

When the input/output interface computer block 15 recognizes the owner's voice request to execute a secretary proxy business entered by the voice input device 12 and the agent computer block 16 determines that there is voice recognition string character data inputted to the agent computer block 16, from the input/output interface computer block 15, the agent computer block 16 causes the input/output interface computer block 15 to analyze the meaning of the request and classify the request at step S12. When the agent computer block 16 determines from the result of the analysis and classification that the request is not to get owner' private information, it reads a file meeting the content of the request, sends a request signal to start up an appropriate application via the PC interface to the personal computer 2 to thereby perform processing which meets the request (step S49).

Thereafter, when the agent computer block 16 terminates the processing for the request of the user other than the owner, it returns to waiting for a request from another user other than the owner at step S45, which is then repeated.

As described above, the agent computer block 16 of the agent device 10 provided in the computer system of the second embodiment selects the private secretary agent when the accessing user is the owner of the secretary agent, and selects the proxy agent in behalf of the owner when the accessing user is one other than the owner, on the basis of the voice data received from the input/output interface computer block 15 in accordance with the agent table stored in the storage device 17, reads from the storage device 17 information on the selected agent, transfers this information to the input/output interface computer block 15, display the agent's peculiar figure (manly, face) on the display device 13 in accordance with the agent set information, and outputs a message in the agent's peculiar voice from the voice output device 11.

Thus, the agent device 10 of the second embodiment identifies the accessing user based on the voice information, so that the agent computer block 16 can omit a process to be performed for security such as entering the owner's password to thereby achieve an improved log-in process in the access.

The agent device 10 of the second embodiment include the owner's private secretary agent and the owner's proxy agent. A peculiar agent corresponding to accessing user is automatically selected based on the agent table. Thus, the owner is free to set "secretary agent's peculiar information" such as the secretary agent's peculiar face, voice, name, etc., and "owner information" and the owner is able to arrange the various set information items on those agents and the visual display/auditory output aspects of those agents so that those agents are easy for the owner to use, and hence the user is able to access the agent smoothly. In addition, the "proxy agent information" is settable properly so as to appropriately deal with an accessing user other than the owner in behalf of the owner and the owner's private information will be opened to the owner, but closed to users other than the owner.

<Third Embodiment>

FIGS. 13–19 show a third embodiment of the present invention. The third embodiment has the same composition as the first embodiment of FIGS. 1 and 2. Briefly, unlike the second embodiment, however, the third embodiment operates as follows. The agent computer block 16 selects an agent based on a respective one of various tables stored in the storage device 17. More specifically, the agent computer block selects an agent corresponding to a specified agent icon from among displayed agent icons for agents readable in the present time band based on a time band set table 17a of FIG. 13 among the various tables stored in the storage device 17 and displayed on the display device 13, displays on the display device 13 the selected agent and a file processable by the agent on the basis of an agent permission information table 17b of FIG. 14 of the various tables, selects a greeting message sentence in the present time band on the basis of a message table 17d of FIG. 16 of the various tables, and outputs in the agent's voice from the voice output device 11 a message including a greeting, self-introduction and a request to the user. When the agent computer block 16 then receives a request from the input/output interface computer block 15, it analyzes the meaning of the request, determines whether there is a request to report a schedule to the user or a request to access a server.

The storage device 17 includes a storage medium 18 composed of a magnetic or optical recording medium or semiconductor memory provided fixedly or removably in the storage device 17 and contains an agent basic program, various programs corresponding to the basic program and including a request and keyword analysis program, executed by the agent computer block 16, and various tables. The respective embodiments of the various tables are shown in FIGS. 13–15. A time band set table 17a of FIG. 13 contains a plurality of groups of a day of the week and a time band and a corresponding plurality of agents each readable for a corresponding group of a day of the week and a time band. A agent permission information table 17b of FIG. 14 contains a plurality of agents and a corresponding plurality of files each processable by a corresponding agent. An agent individual information table 17c of FIG. 15 contains a plurality of agents and a corresponding plurality of agent's individual information items each, for example, of an agent's voice, face, name, and agent icon image. A message table 17d of FIG. 16 contains a plurality of time bands usable and a corresponding plurality of greeting message sentences used in the respective time bands.

Selection of an agent executed by the agent computer block 16 will be described next with reference to flow charts of FIGS. 17 and 18.

Figure 19A:
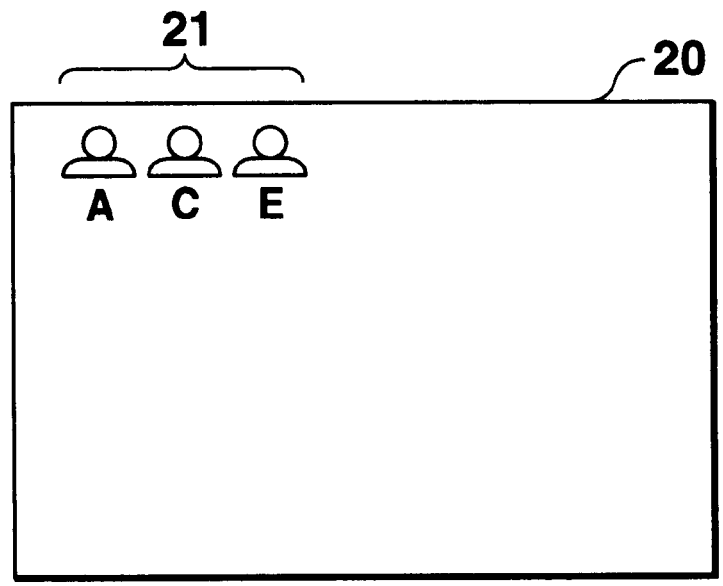
FIGS. 19A and 19B show an agent selecting picture displayed based on one of various tables stored in the storage device 17 and a picture in which a user has selected one agent from a plurality of agents on the agent selecting picture, respectively, on an agent window 20 of the agent device 10.
Figure 19B:
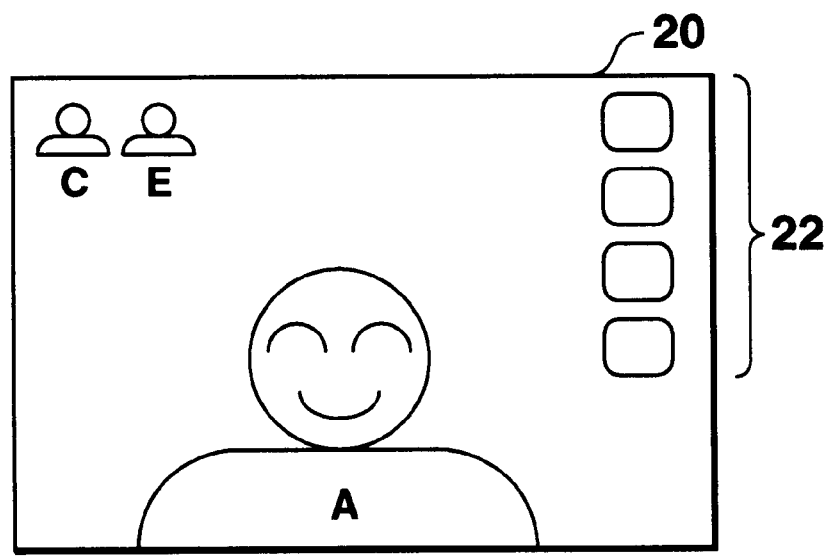

FIG. 19A shows an agent select picture displayed based on a respective one of various tables stored in the storage device 17 on a display screen, (hereinafter referred to as an agent window 20) of the display device 13 of the agent device 10 in the agent select process. FIG. 19B shows a picture of one agent on the agent window 20 selected by the user from among a plurality of agents displayed on the agent select picture.

Figure 17:
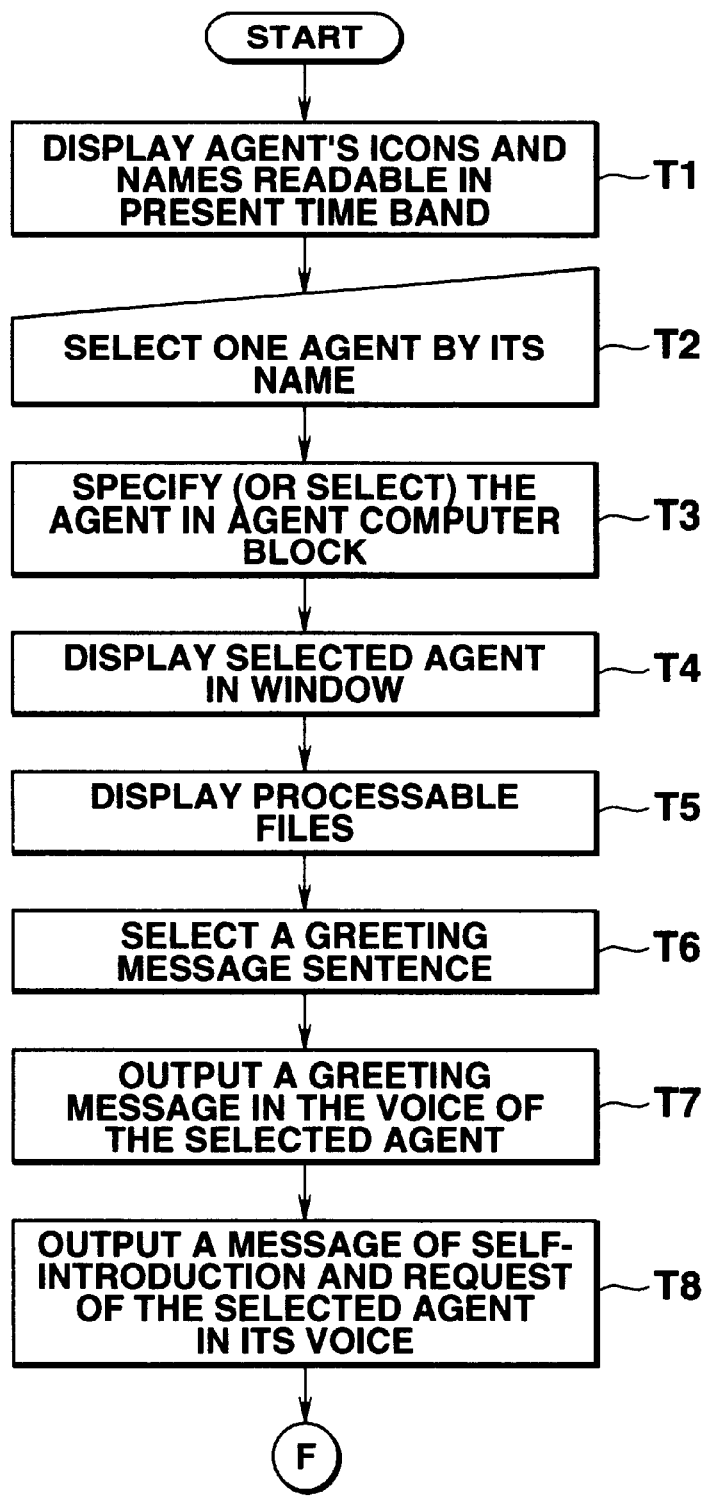
FIG. 17 shows a part of a flow chart of an agent selecting process performed by an agent computer block 16.
Figure 18:
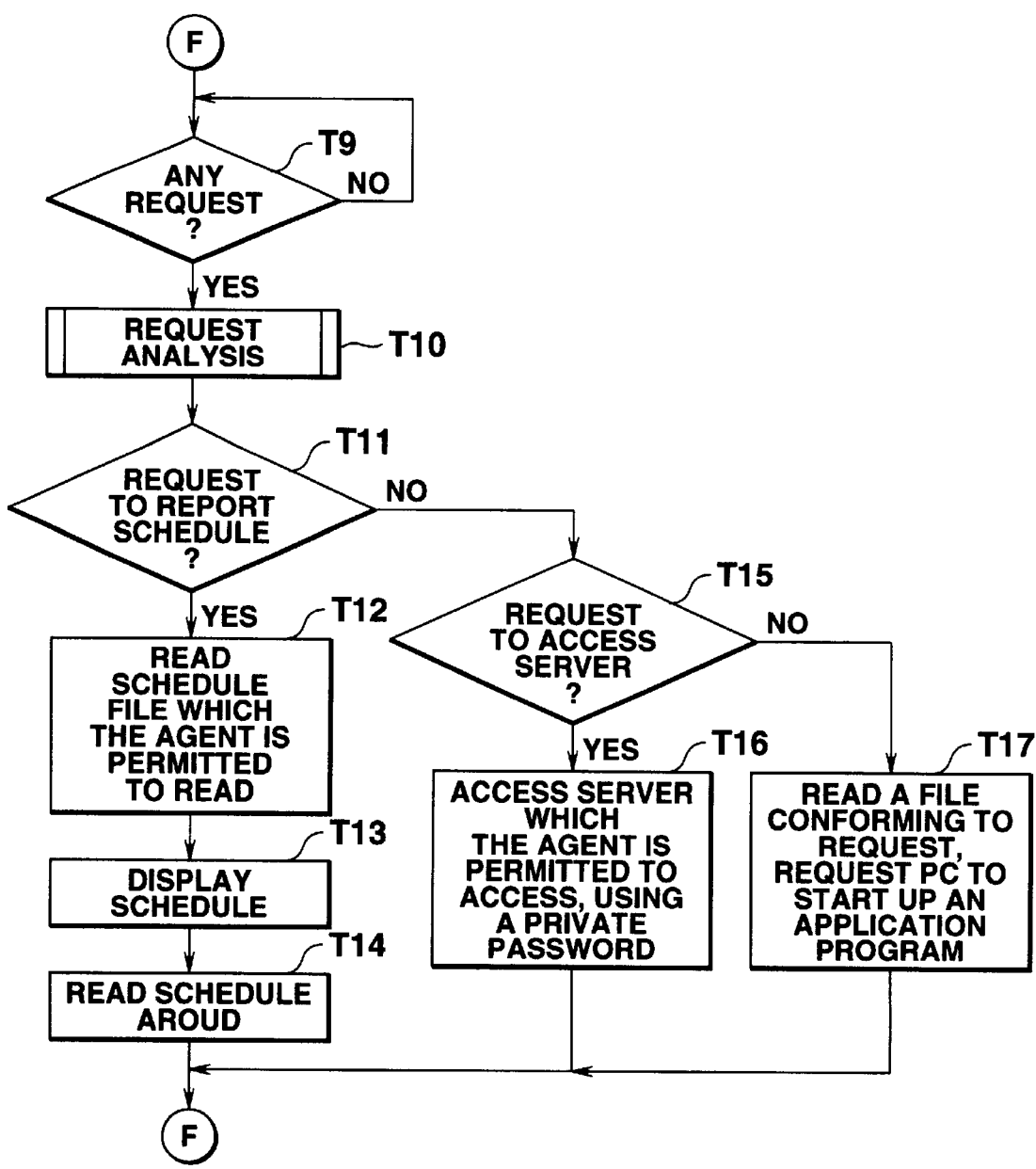
FIG. 18 is a flow chart continued to FIG. 17.

In FIG. 17, first, the agent computer block 16 displays a plurality of agent icons 21 and names readable in the present time band on the agent window 20 of the display device 13 of the input/output interface computer block 15 on the basis of the time set table 17a of FIG. 13 stored in the storage device 17, as shown in FIG. 19A (step T1).

The agent computer block 16 contains the plurality of agents which are divided so as to come into respective processable territories which represent, for example, up to which file are openable, up to which application are usable, up to which individual information are knowable, etc. Each agent reports a required respective one of various information items or responds to a user's request in the range of a relevant territory. Each agent is allocated a day of the week and a respective one of time divisions of the day when the agent acts. As shown in the time band setting table 17a of FIG. 13, a readable agent is selected in accordance with a day of the week and a time division of the day when the user accessed the agent.

For example, as shown by the time band set table 17a of FIG. 13 and the agent permission information table 17b of FIG. 14, one agent A of the plurality of agents in a business time (07:00–17:00 o'clock of Monday–Friday) is a business secretary agent who supports various business-related processes and who has a business-related schedule, customer addresses, information for accessing servers in an in-company network, and information by which business-related document files are accessible. An agent B in a non-business time (17:00–2:00 o'clock in each of Monday–Friday) is a personal secretary agent who supports the user personally in a non-business field and has a personal schedule, personal addresses, information on access to the agent's home server, information to access various personal created files, etc, in a non-business field.

The agents each contain a peculiar different image (hereinafter referred to as faces), name, voice, agent icon image, etc., based on the agent individual information table 17c of FIG. 15 stored in the storage device 17. As shown in FIG. 19A, the plurality of pairs of face and name are displayed as a corresponding plurality of agent icons 21 on the agent window 20 of the display device 13.

The agent computer block 16 specifies one agent from among the plurality of agents displayed on the agent window 20 readable in the present time band, in response to the user calling that agent's name or touching with a finger an agent icon 21 of that agent (step T2). When the user calls the agent's name, the name is provided from the voice input device 12, the input/output interface computer block 15 recognizes it agent select request data as the result of the analysis to the agent computer block 16. When the user touches the agent icon 21 with his or her finger, the agent select request data delivered to the input/output interface computer block 15 from the display device 13 is delivered to the agent computer block 16.

The agent computer block 16 specifies the agent specified by the user in accordance with the agent select request data provided by the input/output interface computer block 15 (step T3), and as shown in FIG. 19B, displays the peculiar image (face) of the selected agent on the agent window 20 of the display device 13 (step T4), and displays files processable by the selected agent as file icons 22 on the agent window 20, as shown in FIG. 19B, on the basis of the agent permission table 17b of FIG. 14 stored in the storage device 17 (step T5). The agents other than the selected agent are displayed intact as agent icons 21 on the agent window 20.

The agent computer block 16 selects a greeting message sentence depending on the present time band on the basis of the message table 17d of FIG. 16 stored in the storage device 17 (step T6), and instructs the input/output interface computer block 15 to output the greeting message sentence from the voice output device 11 in the selected-agent's peculiar voice based on the agent individual information table 17c of FIG. 15 (step T7).

As shown in FIG. 19A, for example, if the present time is 10:00 o'clock, Tuesday, the receptive faces of agents A, C and E are displayed as agent icons 21 on the agent window 20 on the basis of the time band set table 17a of FIG. 13. The user then specifies one of the agents A, C and E by calling that agent's name or touching with a finger the relevant one of the agent icons 21 displayed on the agent window 20. When the user specifies the agent A, the face of the selected agent A is displayed as an enlarged one on the agent window 20, as shown in FIG. 19B. The faces of the unselected agents C and E are displayed as they are as agent icons 21 on the agent window 20. Simultaneously, the business-related schedule, customer addresses, information on access to servers in the intra-company network, business-related document files, etc., as files processable by the agent A are displayed as file icons 22 on the agent window 20 on the basis of the agent permission information table 17b of FIG. 14. A greeting message "Good morning" for the present time of 10 o'clock is outputted from the voice output device 11 on the basis of the message table 17d of FIG. 16 in the peculiar voice of the agent A based on the agent individual information table 17c of FIG. 15.

The agent computer block 16 instructs the input/output interface computer block 15 to output from the voice output device 11 a voice message involving self-introduction of the selected agent and a request to give the selected agent a request based on the agent individual information table 17c of FIG. 15 stored in the storage device 17 (step T8), and waits for incoming voice recognition character string data based on the user's voice request to the request to give the agent a request from the input/output interface computer block 15 (step T9). That is, the agent computer block 16 determines whether the input/output interface computer block 15 has recognized the user's voice request provided by the user's voice input device 12 and hence whether voice recognition character string data involving the voice request is delivered to the agent computer block 16.

When the agent computer block 16 receives the voice recognition character string data from the input/output interface computer block 15, it instructs the input/output interface computer block 15 to analyze the content of the voice request (step T10), and determines on the basis of the result of the analysis whether the request is to "report the user's schedule to the user" (step T11).

If so, the agent computer block 16 reads out from the storage device 17 a schedule file, which the agent is permitted to read, on the basis of the agent permission information table 17b of FIG. 14 stored in the storage device 17 (step T12), displays the schedule on the display device 13, and instructs the input/output interface computer block 15 to output a message in the selected-agent's peculiar voice from the voice output device 11 on the basis of the agent individual information table 17c of FIG. 15 (steps T13, T14).

When the agent computer block 16 determines that the result of the analysis of the user's request is not to "report the schedule to the user", it further determines whether the request is to "access a server" (step T15). If so, the agent computer block 16 reads information for accessing a server, which the agent is permitted to read, from the storage device 17 on the basis of the agent permission information table 17b of FIG. 14 stored in the storage device 17 and accesses the server, using a password (step T16).

When the agent computer block 16 determines that the user's request is neither to "report a schedule" nor to "access a server", the agent computer block 16 instructs the input/output interface computer block 15 to read from the storage device 17 a file meeting the request, which the agent is permitted to read, on the basis of the agent permission information table 17b of FIG. 14 stored in the storage device of FIG. 17 and display a response to the request on the display device 13, and to output a response message to the request from the voice output device 11 in the peculiar voice of the selected agent on the basis of the agent individual information table 17c of FIG. 15, or transfers to the personal computer 2 a request to start up an application program meeting the content of the request and executes an action/information advising process (step T17). Then, after steps 14, 16 and 17, the agent computer block 16 returns to the process for confirming the specified voice recognition data at step T9.

As described above, the agent computer block 16 of the agent device 10 provided in the computer system of the present embodiment selects an agent based on a respective one of the various tables stored in the storage device 17. More specifically, the agent computer block 16 selects an agent corresponding to a specified agent icon 21 from among displayed agent icons for agents readable in the present time band based on the time band set table 17a of FIG. 13 among the various tables stored in the storage device 17 displayed on display device 13, and displays the selected agent and files processable by that agent on the display device 13 on the basis of the agent permission information table 17b of FIG. 14 of the various tables. In response to this operation, the agent computer block 16 selects a greeting message sentence in the present time band on the basis of the FIG. 16 message table 17d of the various tables, outputs in the agent's voice from the voice output device 11 a message including a greeting, self-introduction, and request. When the agent computer block 16 receives the user's request from the input/output interface computer block 15, it analyzes the meaning of the user's request provided by the input/output interface computer block 15 to determine whether the user's request is to report the user's schedule to the user or to access a server.

When the user's request is to report the user's schedule to the user, the agent computer block 16 reads from the storage device 17 a schedule file, which the agent is permitted to read, transfers the file to the input/output interface computer block 15, displays the schedule on the display device 13, outputs the schedule as a voice message from the voice output device 11. If the request is to access a server, the agent computer block 16 performs access to a server which the agent was permitted to access. If the request is a different one, the agent computer block reads from the storage device 17 a file meeting the different request, and controls the display and voice output process of the input/output interface computer block 15, or sends the personal computer 2 a request to start up an application meeting the content of the request.

Thus, in the agent device 10 of the present embodiment, agents take charge of their respective special fields so as to deal with corresponding requests. Each agent is allocated a time, and has a peculiar image (face), voice, name, etc., set therein. Thus, by selecting a special agent by calling same its name in accordance with the request from among agents whose faces are displayed as agents icons 21 depending on the present time, the user is able to selectively use the respective agents having different special fields and responding to peculiar calling voices to cause the selected agent to report to the user a respective one of various information items/to give the agent a respective one of various requests.

Thus, by selectively using a plurality of agents different in specialty and operation time in the agent function of the embodiment, loads to be processed by the respective agents by the time when the respective agents perform proxy businesses which the user desires are reduced, each agent can rapidly deal with the user's request and can rapidly report a respective one of the various respective information items to the user and the user is able to rapidly give the agent a respective one of the various requests.

What is claimed is:

1. An information processor which includes a plurality of agents each for performing on behalf of a user a process which meets a respective one of the user's various requests in accordance with that request, comprising:

an information storing device which contains user information in which a plurality of users are placed in corresponding relationship to a plurality of agents, and a plurality of expression information items each peculiar to a respective one of the plurality of agents;

input means operated by a user for providing a respective one of the user's various processing requests;

identifying means for identifying the user based on the content of that request provided by said input means and the user information; and selecting means for selecting an agent corresponding to the identified user from the user information stored in said information storing device, and for responding to the processing request provided by said input means on the basis of expression information peculiar to the agent contained in said information storing device, wherein said responding means changes the agent's peculiar expression based on the expression information depending whether the identified user is waiting for a request provided by said input means or if processing based on the provided request is under execution.

2. The information processor according to claim 1, wherein said input means comprises voice input means for providing the respective processing requests in the user's voice;

said information storing device contains data on the features or content of the user's voice as the user information; and said identifying means is responsive to the user providing a respective one of the various processing request in the user's voice from said voice input means for identifying the user on the basis of the features or content of the user's voice contained in said information storing means.

3. The information processor according to claim 1, wherein said plurality of agents and said information storing device belong to another information processor to which the first-mentioned information processor is connected via a line; and said identifying means is responsive to said input means operated by the user providing a processing request to read the user information from said information storing device which belongs to said another information processor and identifies the appropriate user, and selects a corresponding agent from among the user information.

4. The information processor according to claim 3, wherein said selecting means selects the agent to read peculiar expression information corresponding to the agent from the information storing device which belongs to said another information processor corresponding to the agent and to make a response based on the read expression information depending on the request provided by said input means by the identified user.

5. The information processor according to claim 4, wherein said responding means changes the agent's peculiar expression based on the expression information depending whether the identified user is waiting for a request provided by said input means or if processing based on the provided request is under execution.

6. The information processor according to claim 4, wherein said selecting means is responsive to the information to be presented as a response to the user to change the peculiar expression of the agent based on the expression information.

7. The information processor according to claim 3, wherein said responding means changes the agent's peculiar expression based on the expression information depending whether the identified user is waiting for a request provided by said input means or if processing based on the provided request is under execution.

8. The information processor according to claim 3, wherein said selecting means is responsive to the information to be presented as a response to the user to change the peculiar expression of the agent based on the expression information.

9. An information processor which includes a plurality of agents each for performing on behalf of a user a process which meets a respective one of the user's various requests in accordance with that request, the information processor comprising:

an information storing device which contains user information in which a plurality of users are placed in corresponding relationship to a plurality of agents, and a plurality of expression information items each peculiar to a respective one of the plurality of agents;

input means operated by a user for providing a respective one of the user's various processing requests;

identifying means for identifying the user based on the content of that request provided by said input means and the user information; and selecting means for selecting an agent corresponding to the identified user from the user information stored in said information storing device, and for responding to the processing request provided by said input means on the basis of expression information peculiar to the agent contained in said information storing device, wherein said selecting means is responsive to the information to be presented as a response to the user to change the peculiar expression of the agent based on the expression information.

10. The information processor according to claim 9, wherein said plurality of agents and said information storing device belong to another information processor to which the first-mentioned information processor is connected via a line; and said identifying means is responsive to said input means operated by the user providing a processing request to read the user information from said information storing device which belongs to said another information processor and identifies the appropriate user, and selects a corresponding agents from among the user information.

11. The information processor according to claim 9, wherein said responding means is responsive to said identifying means selecting the agent to read peculiar expression information corresponding to the agent from the information storing device which belongs to said another information processor corresponding to the agent and to make a response based on the read expression information depending on the request provided by said input means by the identified user.

12. An information processor having a plurality of agents each for performing on behalf of a user a process depending on a respective one of a user's various processing requests, the information processor comprising:

an expression information storing device which contains for the plurality of agents a corresponding plurality of peculiar expression information items each for expressing features of a respective one of the plurality of agents;

selecting means for selecting one of the plurality of agents and for providing a respective one of the user's various processing requests; and receiving means responsive to said selecting means for receiving from said expression information storing device expression information peculiar to the selected agent to send to the user a response to characterize the agent and for responding to the respective processing request provided by the selecting means on the basis of the peculiar expression information.

13. The information processor according to claim 12, wherein said plurality of agents has set a corresponding plurality of processing divisions into which the various processing requests are divided and a corresponding plurality of response divisions into which response levels corresponding to the various requests are divided; and said responding means responds to the request, provided by said selecting means, on the basis of the peculiar expression information for the agent in accordance with the processing division and sets the response on the basis of the responding division, and sets the content of the response on the basis of the response division.

14. The information processor according to claim 13, wherein the processing division and the responding division of at least one of the plurality of agents correspond to the content of the processing request which relates to a business field of a user who uses the present information processor.

15. The information processor according to claim 13, wherein the processing division and the responding division of at least one of the plurality of agents correspond to the content of the processing request which relates to a personal field of a user who uses the present information processor.

16. The information processor according to claim 12, wherein a face such as a peculiar one, a voice such as a peculiar one, and a name such as a peculiar one are settable in a peculiar expression information item stored for each of the plurality of agents in said expression information storing device, and said responding means is responsive to a peculiar name set in said expression information storing device being provided by said selecting means to select an agent corresponding to the peculiar name.

17. The information processor according to claim 12, wherein:
   a display means is provided for selectively displaying peculiar image information which include that on a face set as the peculiar expression information for each of the plurality of agents; and
   said receiving means is responsive to said selecting means selecting one of the displayed plurality of peculiar image information items to display the selected peculiar image information alone on said display means.

18. An information processor which includes a plurality of agents each for performing a process responding to a respective one of various processing requests, the information processor comprising:
   an information storing device which contains for the plurality of agents a corresponding plurality of peculiar expression information items each different in a peculiar image or peculiar voice which characterizes a respective one of the plurality of agents and which has set a plurality of time divisions each such as a date or time corresponding to a respective one of the plurality of agents;
   output means for outputting a respective one of the various processing requests; and
   selecting means responsive to said output means for selecting from said information storing device an agent for a time division corresponding to a time when the processing request was provided by said input means, for receiving from said expression information storing device peculiar expression information corresponding to that agent, and for responding to the processing request in an expression form based on the peculiar image or voice of that agent.

19. The information processor according to claim 18, wherein the time division set in each of the plurality of agents contained in said information storing device comprises one of time divisions of a day or a division of a day of the week.

20. The information processor according to claim 18, wherein the time division of at least one of the plurality of agents is set in working hours and to correspond to the content of the processing request related to a business field of a user who uses the present information processor.

21. The information processor according to claim 18, wherein the time division of at least one of the plurality of agents is set in non-working hours and to correspond to the content of the processing request related to an individual field of a user who uses the present information processor.

22. A recording medium which contains a computer executable program, comprising:
   a program code for causing a respective one of a plurality of agents to perform a process responding to a respective one of various processing requests on a user's behalf on the basis of peculiar expression information; and
   a program code responsive to input means selecting one of the plurality of agents to get peculiar expression information corresponding to that agent, to make a response to characterize that agent, and to make a response based on the peculiar expression information to the respective one of the various processing requests provided by the input means.

23. A storage medium which contains a computer executable program, comprising:
   a program code for causing each of a plurality of agents to perform on behalf of a user a process in a respective one of time divisions corresponding to a date or time to respond to a respective one of the user's various processing requests on the basis of a plurality of expression information items different in at least one of peculiar image, peculiar voice; and
   a program code responsive to input means providing a respective one of the user's various processing requests for selecting an agent in a time division corresponding to the time when the input means provided that processing request from among the plurality of agents, for getting peculiar expression information corresponding to that agent, and for causing that agent to respond to the processing request in an expression form based on the peculiar image or voice of that agent.

* * * * *